United States Patent
Chun et al.

(10) Patent No.: US 12,006,448 B2
(45) Date of Patent: Jun. 11, 2024

(54) ADHESIVE COMPOSITION

(71) Applicant: SHANJIN OPTOELECTRONICS (SUZHOU) CO., LTD., Zhangjiagang (CN)

(72) Inventors: Sang Ki Chun, Daejeon (KR); Kyoung Hoon Kim, Daejeon (KR); Hae Sung Cho, Daejeon (KR); Jin Ah Seok, Daejeon (KR); Jun Gu Yeo, Daejeon (KR)

(73) Assignee: SHANJIN OPTOELECTRONICS (NANJING) CO., LTD., Jiangsu (CN)

( * ) Notice: Subject to any disclaimer, the term of this patent is extended or adjusted under 35 U.S.C. 154(b) by 409 days.

(21) Appl. No.: 16/649,447

(22) PCT Filed: Aug. 14, 2018

(86) PCT No.: PCT/KR2018/009330
§ 371 (c)(1),
(2) Date: Mar. 20, 2020

(87) PCT Pub. No.: WO2019/117422
PCT Pub. Date: Jun. 20, 2019

(65) Prior Publication Data
US 2020/0277519 A1    Sep. 3, 2020

(30) Foreign Application Priority Data
Dec. 15, 2017   (KR) .......................... 10-2017-0172984

(51) Int. Cl.
| | |
|---|---|
| *C09J 129/04* | (2006.01) |
| *B32B 7/12* | (2006.01) |
| *C08K 5/3492* | (2006.01) |
| *C08K 5/42* | (2006.01) |
| *C08K 5/54* | (2006.01) |
| *C09J 11/06* | (2006.01) |

(52) U.S. Cl.
CPC ............... *C09J 129/04* (2013.01); *B32B 7/12* (2013.01); *C08K 5/34922* (2013.01); *C08K 5/42* (2013.01); *C08K 5/54* (2013.01); *C09J 11/06* (2013.01); *B32B 2457/20* (2013.01); *B32B 2551/00* (2013.01); *C09J 2203/00* (2013.01); *C09K 2323/053* (2020.08)

(58) Field of Classification Search
CPC .. B32B 7/12; B32B 7/2457; C09J 7/20; C09J 7/22; C09J 11/06; C09J 129/04; C09J 2203/00; C08K 5/0025; C08K 5/42; C08K 5/34922; C08K 5/5419; C08K 5/5435; C09K 2323/053; G02B 5/30; G02B 27/28; G02F 1/1335; G02F 1/133528
See application file for complete search history.

(56) References Cited

U.S. PATENT DOCUMENTS

| | | | |
|---|---|---|---|
| 5,763,096 A | 6/1998 | Takahashi et al. | |
| 2006/0033993 A1 | 2/2006 | Sugino et al. | |
| 2007/0148483 A1* | 6/2007 | Tomoguchi | C08J 5/124 |
| | | | 524/557 |
| 2016/0085006 A1 | 3/2016 | Akizuki et al. | |
| 2017/0101561 A1* | 4/2017 | Choi | G02F 1/133528 |

FOREIGN PATENT DOCUMENTS

| | | | | |
|---|---|---|---|---|
| CN | 101333430 A | | 12/2008 | |
| CN | 111051458 B | * | 12/2021 | ............... B32B 7/12 |
| JP | 200380639 A | | 3/2003 | |
| JP | 2004315430 A | * | 11/2004 | |
| JP | 6922079 B2 | * | 8/2021 | ............... B32B 7/12 |
| KR | 100435139 B1 | | 2/2005 | |
| KR | 100888572 B1 | | 3/2009 | |
| KR | 20120068452 A | | 6/2012 | |
| KR | 101188758 B1 | * | 10/2012 | ............... G02B 5/30 |
| KR | 20150015569 A | | 2/2015 | |
| KR | 20150037197 A | | 4/2015 | |
| KR | 20160100145 A | | 8/2016 | |
| KR | 20170098475 A | | 8/2017 | |
| KR | 102218852 B1 | * | 2/2021 | ............... B32B 7/12 |
| TW | 201614283 A | | 4/2016 | |
| TW | I713881 B | * | 12/2020 | ............... B32B 7/12 |

OTHER PUBLICATIONS

International Search Report for Application No. PCT/KR2018/009330, mailed Nov. 23, 2018, pp. 1-3.
Taiwan Search Report for Application No. 107128903, dated Mar. 19, 2019, 1 page.
Taiwanese Search Report for Application No. TW 107128903 dated Feb. 18, 2020, 1 page.

\* cited by examiner

*Primary Examiner* — Sophie Hon
(74) *Attorney, Agent, or Firm* — Schmeiser, Olsen & Watts, LLP

(57) ABSTRACT

An adhesive composition includes a polyvinyl alcohol binder, a crosslinking agent and a compound of Formula 1 below, $$HO-SO_2-R \qquad \text{[Formula 1]}$$

wherein in Formula 1, R is an alkyl group, a haloalkyl group or a haloalkylaryl group. The adhesive composition may have excellent water resistance, adhesive force and other optical properties as well as greatly improved storage stability.

6 Claims, No Drawings

ADHESIVE COMPOSITION

The present application is a national stage entry under 35 U.S.C. § 371 of International Application No. PCT/KR2018/009330 filed on Aug. 14, 2018, which claims priority to Korean Patent Application No. 10-2017-0172984 filed on Dec. 15, 2017, the disclosures of which are incorporated herein by reference in their entirety.

TECHNICAL FIELD

The present application relates to an adhesive composition.

BACKGROUND ART

An adhesive composition can be used in a variety of applications including optical applications. For example, the adhesive composition can be used for an application of attaching a polarizer and a protective film in the construction of a polarizing plate which is an optical laminate.

The physical properties required in the adhesive composition applied to such applications are optical properties such as excellent transparency, water resistance, adhesiveness and storage stability, and the like, but it is not easy to simultaneously realize such physical properties.

DISCLOSURE

Technical Problem

The present application relates to an adhesive composition. It is one object of the present application to provide an adhesive composition having excellent water resistance, adhesive force and other optical properties as well as improved storage stability.

Technical Solution

The present application relates to an adhesive composition. In one example, the adhesive composition of the present application may be an aqueous adhesive composition, and may be applied to various applications. In one example, the adhesive composition of the present application may be applied to the production of an optical laminate. The adhesive composition may include a polyvinyl alcohol binder, a crosslinking agent and a compound of Formula 1 below:

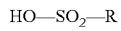  [Formula 1]

wherein in Formula 1, R is an alkyl group, a haloalkyl group or a haloalkylaryl group.

The adhesive composition comprises a binder. In the present application, the kind of the applicable binder is not particularly limited, and in one example, a typical aqueous binder resin known in the field of the aqueous adhesive composition may be used. As the aqueous binder resin, for example, any one or a mixture selected from a polyvinyl alcohol-based mixture and a polyallylamine resin, and the like may be used, and in general, a polyvinyl alcohol-based resin may be used.

As the polyvinyl alcohol-based resin, for example, a modified polyvinyl alcohol binder, such as an acetoacetyl group-modified binder, a carboxyl group-modified binder, a methylol group-modified binder, an amino group-modified binder and/or an epoxy-modified binder, and the like may be used. Considering reactivity and durability, and the like, as the acetoacetyl group-modified polyvinyl alcohol binder, a polyvinyl alcohol binder having an acetoacetyl group may be used.

The acetoacetyl group-modified polyvinyl alcohol binder is a polymer containing an acetoacetyl group in the polyvinyl alcohol chain, which may also further comprise an additional functional group in addition to the functional group, if necessary.

The acetoacetyl group-modified polyvinyl alcohol binder may be produced according to a known production method or obtained by a known route, which may be produced through, for example, a method of reacting polyvinyl alcohol with diketene, a method by ester exchange reaction of polyvinyl alcohol and an acetoacetic acid ester, a method of saponifying a copolymer of a vinyl ester monomer and an acetoacetic ester, and the like.

A method of reacting polyvinyl alcohol with diketene is generally used in terms of the fact that the production process is simple and an acetoacetyl group-modified polyvinyl alcohol binder having good quality can be obtained.

A specific example of the method of reacting polyvinyl alcohol with diketene may include a method of dispersing polyvinyl alcohol in a solvent such as acetic acid and then adding diketene thereto, a method of previously dissolving polyvinyl alcohol in a solvent such as dimethylformamide or dioxane and then adding diketene, or a method of directly contacting diketene gas or liquid diketene with polyvinyl alcohol, and the like, but is not limited thereto.

As long as the acetoacetyl group-modified polyvinyl alcohol binder has a degree of acetoacetyl group modification of about 0.1 mol % or more, it can be used without any particular limitation, where the degree of modification in a range of about 0.1 mol % to about 40 mol %, about 1 mol % to 20 mole % or about 2 mole % to about 7 mole % is generally applied. Water resistance and water solubility, and the like can be improved in such a degree of modification.

Also, a degree of saponification of the polyvinyl alcohol binder is not particularly limited, but it may be about 80 mol % or more or about 85 mol % or more in consideration of water solubility and the like.

The polyvinyl alcohol used upon producing the acetoacetyl group-modified polyvinyl alcohol binder is not particularly limited, but one having an average polymerization degree in a range of about 100 to about 3,000 or in a range of about 500 to about 3,000 can be used. Also, the average saponification degree may be in a range of about 80 to about 100 mol % or in a range of about 85 to about 100 mol %.

The binder may be included in the adhesive composition in the form of an aqueous solution. At this time, there is no particular limitation on the concentration of the binder resin, and for example, it can be adjusted to be in a solid content of about 1 to about 10 parts by weight, about 1 to about 8 parts by weight, or about 1 to about 5 parts by weight relative to 100 parts by weight of water as a solvent.

In addition, here, as the water which is a solvent, pure water, ultrapure water, tap water or the like can be used without any particular limitation.

The acetoacetyl group-modified polyvinyl alcohol binder is also known by the product name of Z-100, Z-200, Z-200H, Z-210, Z-220 or Z-320, and the like from Nippon Synthetic Chemical Gohasefimer, Co.

The adhesive composition also comprises a crosslinking agent, where the specific kind thereof is not particularly limited. For example, as the crosslinking agent, among those that are used in a polyvinyl alcohol adhesive, a compound with at least two functional groups having reactivity with the polyvinyl alcohol can be used without limitation. For example, the crosslinking agent may include an alkylene diamine compound having an alkylene group and two amino groups such as ethylenediamine, triethylenediamine or hexamethylenediamine; an isocyanate compound such as tolylene diisocyanate, hydrogenated tolylene diisocyanate, a trimethylolpropane tolylene diisocyanate adduct, triphenylmethane triisocyanate, methylene bis(4-phenylmethanetriisocyanate, isophorone diisocyanate and their ketoxime block products or phenol block products; an epoxy compound such as ethylene glycol diglycidyl ether, polyethylene glycol diglycidyl ether, glycerin di or triglycidyl ether, 1,6-hexanediol diglycidyl ether, trimethylol propane triglycidyl ether, diglycidyl aniline or diglycidyl amine; a monoaldehyde compound such as formaldehyde, acetaldehyde, propionaldehyde or butyl aldehyde; a dialdehyde compound such as glyoxal, malondialdehyde, succindialdehyde, glutardialdehyde, maledialdehyde or phthaldialdehyde; an amino-formaldehyde resin such as a condensate of methylol urea, methylol melamine, alkylated methylol urea, alkylated methylol melamine, acetguanamine or benzoguanamine with formaldehyde; or a salt of a divalent metal or trivalent metal such as sodium, potassium, magnesium, calcium, aluminum, iron and nickel, and an oxide thereof, and the like.

In one example, as the crosslinking agent, a melamine crosslinking agent can be used. The kind of the melamine crosslinking agent that can be used is not particularly limited, but for example, a compound represented by Formula 2 below can be used.

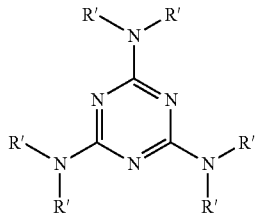

[Formula 2]

In Formula 2, each R' may be independently a hydrogen atom, a hydroxyalkyl group, an alkoxyalkyl group, an alkoxy group or a carboxyalkyloxyalkyl group, and the like.

In one example, at least one R' in Formula 2 above may be a hydroxyalkyl group, or may be an alkoxyalkyl group.

In Formula 2, the alkyl group may be an alkyl group having 1 to 20 carbon atoms, 1 to 16 carbon atoms, 1 to 12 carbon atoms, 1 to 8 carbon atoms or 1 to 4 carbon atoms, which may be linear, branched or cyclic, and may be optionally substituted by one or more substituents.

Also, in Formula 2, the alkoxy group may be an alkoxy group having 1 to 20 carbon atoms, 1 to 16 carbon atoms, 1 to 12 carbon atoms, 1 to 8 carbon atoms or 1 to 4 carbon atoms, which may be linear, branched or cyclic, and may be optionally substituted by one or more substituents.

In the present application, the ratio of such a crosslinking agent is not particularly limited, where an appropriate amount can be used in consideration of water resistance and the like of the adhesive. For example, the crosslinking agent may be used in a ratio of about 5 to 50 parts by weight relative to 100 parts by weight of the binder. In another example, the ratio may be about 10 parts by weight or more, and may also be about 45 parts by weight or less, about 40 parts by weight or less, about 35 parts by weight or less, about 30 parts by weight or less, about 25 parts by weight or less, or about 20 parts by weight or less or so.

The adhesive composition comprises, as an additional component, a compound of Formula 1 below. The compound of Formula 1 below can simultaneously improve the storage stability and the crosslinking efficiency of the adhesive composition. Although the reason for this is not clear, it is believed that the compound ensures storage stability by effectively capping the functional group of the crosslinking agent and simultaneously ensures the desired effect by quickly decapping it, if necessary.

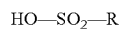 [Formula 1]

In Formula 1, R is an alkyl group, a haloalkyl group or a haloalkylaryl group.

In Formula 1, as the halogen atom contained in the haloalkyl group, a fluorine atom or a chlorine atom can be applied, and in one example, a fluorine atom can be applied.

In addition, in Formula 1, the alkyl group may be an alkyl group having 1 to 20 carbon atoms, 1 to 16 carbon atoms, 1 to 12 carbon atoms, 1 to 8 carbon atoms or 1 to 4 carbon atoms, which may be linear, branched or cyclic, and may be optionally substituted by one or more substituents.

Furthermore, in Formula 1, the aryl group may be, for example, an aryl group having 6 to 12 carbon atoms.

In one example, in the compound of Formula 1, R may be a haloalkyl group such as a perfluoroalkyl group, or may be an aryl group (haloalkylaryl group) substituted by the haloalkyl group such as a perfluoroalkylaryl group.

In the present application, the ratio of the compound of Formula 1 is not particularly limited, where an appropriate amount can be used in consideration of the water resistance, the desired storage stability or the crosslinking efficiency of the adhesive, and the like. For example, the compound of Formula 1 may be used in a ratio of about 0.1 to about 20 parts by weight relative to 100 parts by weight of the binder. In another example, the ratio may be about 0.5 parts by weight or more, 1 part by weight or more, or about 1.5 parts by weight or more, and may be about 15 parts by weight or less or so.

If necessary, the adhesive composition may further comprise other components in addition to the above components. Such components may include, for example, a silane compound. In one example, as the silane compound, a compound represented by Formula 3 below can be used.

 [Formula 3]

In Formula 3, $R^1$ is a glycidoxyalkyl group, a (meth) acryloyloxyalkyl group or an aminoalkyl group, $R^2$ is a hydrogen atom, a halogen atom, an alkyl group or an alkoxy group, n is a number in a range of 1 to 4, and if $R^1$ and $R^2$ are each plural, they are each the same or different.

In Formula 3, the alkyl group may be an alkyl group having 1 to 20 carbon atoms, 1 to 16 carbon atoms, 1 to 12 carbon atoms, 1 to 8 carbon atoms or 1 to 4 carbon atoms, which may be linear, branched or cyclic, and may be optionally substituted by one or more substituents.

In addition, in Formula 3, the alkoxy group may be an alkoxy group having 1 to 20 carbon atoms, 1 to 16 carbon atoms, 1 to 12 carbon atoms, 1 to 8 carbon atoms or 1 to 4 carbon atoms, which may be linear, branched or cyclic, and may be optionally substituted by one or more substituents.

Furthermore, in Formula 3, n may also be 1, 2, 3 or 4, and any one of the numbers may be an upper limit or a lower limit.

In the present application, the ratio of the silane compound is not particularly limited, where an appropriate amount can be used in consideration of the water resistance, the desired storage stability or the crosslinking efficiency of the adhesive, and the like. For example, the silane compound may be used in a ratio of about 1 to about 100 parts by weight relative to 100 parts by weight of the binder. In another example, the ratio may be about 5 parts by weight or more, or about 10 parts by weight or more, and may be about 90 parts by weight or less, 80 parts by weight or less, 70 parts by weight or less, 60 parts by weight or less, 50 parts by weight or less, 40 parts by weight or less, 30 parts by weight or less, or about 20 parts by weight or less or so.

If necessary, various additives such as a tackifier, an ultraviolet absorber, an antioxidant, and a stabilizer such as a heat-resistant stabilizer or a hydrolysis-resistant stabilizer can also be combined to the adhesive composition.

The present application also relates to an optical laminate. The optical laminate of the present application may comprise, for example, first and second optical films; and an adhesive layer of the adhesive composition of claim 1 attaching the first and second optical films to each other.

An example of the optical laminate may include a polarizing plate. In this case, any one of the first and second optical films may be a polarizer and the other may be a protective film.

The polarizing plate can be produced by attaching the protective film and the polarizer using the adhesive composition. For example, a protective film may be formed on one side or both sides of the polarizer through an adhesive layer formed by the adhesive composition.

The adhesive layer may be formed on any one of the protective film and the polarizer, or may be formed on both of them. In one example, the adhesive layer may be formed to a thickness of about 1 to 1000 nm. In one example, the adhesive layer may be formed by applying the adhesive composition by a roll method, a spray method or a dipping method, and the like.

After the adhesive layer is formed, the polarizer and the protective film can be attached by a roll laminator or the like. After attaching, a drying process may be performed to form an adhesive layer composed of an applied and dried layer. The drying temperature may be 5° C. to 150° C. or so, or 30° C. to 120° C. or so, and the drying time may be about 120 seconds or more, or about 300 seconds or more, without being limited thereto.

Here, as the polarizer, various polarizers can be used without any particular limitation. The polarizer may include, for example, a uniaxially stretched film obtained by adsorbing a dichroic material such as iodine or a dichroic dye on a hydrophilic polymer film such as a polyvinyl alcohol film, a partially formalized polyvinyl alcohol film or a partially saponificated ethylene-vinyl acetate copolymer film, a polyene oriented film such as a dehydrogenated product of polyvinyl alcohol or a dehydrochlorinated product of polyvinyl alcohol, and the like. The thickness of the polarizer is not particularly limited, but is generally about 5 to 80 μm or so.

A polarizer in which a polyvinyl alcohol film is dyed with iodine and uniaxially stretched can be produced by, for example, immersing polyvinyl alcohol in an aqueous solution of iodine to be dyed and stretching it to 3 to 7 times its original length. If necessary, it may also be immersed in an aqueous solution of boric acid or potassium iodide, and the like. Moreover, if necessary, before dyeing, the polyvinyl alcohol film may be immersed in water and washed with water. There is an effect of preventing unevenness such as dyeing deviations by swelling the polyvinyl alcohol film as well as contamination or an antiblocking agent on the surface of the polyvinyl alcohol film can be cleaned by washing the polyvinyl alcohol film with water. The stretching may be performed after dyeing with iodine or performed while dyeing, or the dyeing with iodine may be performed after stretching. The stretching may also be performed either in an aqueous solution of boric acid or potassium iodide, and the like or in a water bath.

As the polymer or film material forming the protective film, a suitable transparent material can be used. The material for forming the protective film may include a polyester-based polymer such as polyethylene terephthalate or polyethylene naphthalate; a cellulose-based polymer such as diacetylcellulose or triacetylcellulose; an acrylic polymer such as polymethylmethacrylate; a styrene-based polymer such as polystyrene or an acrylonitrile-styrene copolymer (AS resin), a polycarbonate-based polymer, and the like. Also, an example of the polymer for forming the protective film may include a polyolefin-based polymer such as polyethylene, polypropylene, a polyolefin having a cyclo or norbornene structure or an ethylene-propylene copolymer, a vinyl chloride-based polymer, an amide-based polymer such as nylon and aromatic polyamide, an imide-based polymer, a sulfone-based polymer, a polyether sulfone-based polymer, a polyetheretherketone-based polymer, a polyphenylene sulfide-based polymer, a vinyl alcohol-based polymer, a vinylidene chloride-based polymer, a vinyl butyral-based polymer, an allylate-based polymer, a polyoxymethylene-based polymer, an epoxy-based polymer, or a blend of the above polymers, and the like. The protective film may also be formed as a cured layer of a thermosetting or ultraviolet curing resin such as acrylic series, urethane series, acrylic urethane series, epoxy series or silicone series.

Furthermore, it may include the polymer film described in JP Unexamined Patent Publication No. 2001-343529, for example, a resin composition containing (A) a thermoplastic resin having a substituted and/or unsubstituted imide group in its side chain and (B) a thermoplastic resin having substituted and/or unsubstituted phenyl and nitrile groups in its side chain. A specific example may include a film of a resin composition containing an alternating copolymer composed of isobutylene and N-methylmaleimide and an acrylonitrile styrene copolymer. As the film, a film composed of a mixed extruded product of resin compositions and the like may be used. These films have a small phase difference and a small photoelastic coefficient, and thus they can solve problems such as stain due to deformation of the polarizing plate, and also they have a small degree of moisture permeability, and thus they have excellent humidification durability.

The thickness of the protective film can be suitably determined, but it is generally 1 to 500 μm depending on workability such as strength and handling properties, or thin layer properties, and the like.

The surface of the protective film to be bonded to the polarizer can be subjected to a primer treatment. The primer treatment may include a dry treatment such as a plasma treatment or a corona treatment, a chemical treatment such as an alkali treatment (saponification treatment), a coating treatment for forming an easy adhesive layer, and the like. Among them, a coating treatment for forming an easy adhesive layer or an alkali treatment can be performed. Various primer materials such as a polyol resin, a polycarboxylic acid resin and a polyester resin can be used in forming an easy adhesive layer. The thickness of the easy adhesive layer is usually 0.01 to 10 μm or so, 0.05 to 5 μm or so, or 0.1 to 1 μm or so.

The surface of the protective film to which the polarizer is not bonded may be subjected to a treatment for the purpose of a hard coat layer, an antireflection treatment, anti-sticking, diffusion or anti-glare.

The hard coat treatment is performed for the purpose of preventing scratches on the surface of the polarizing plate, etc., where the hard coat may be formed by, for example, a method in which a cured film having excellent hardness and slip characteristics is added to the surface of the protective film by a suitable ultraviolet curable resin such as acrylic series or silicone series. The antireflection treatment is performed for the purpose of preventing reflection of external light on the surface of the polarizing plate, which can be achieved by the formation of a conventional antireflection film or the like. In addition, the anti-sticking treatment is performed for the purpose of preventing adhesion to the adjacent layer.

In addition, the anti-glare treatment is performed for the purpose of preventing external light from reflecting on the surface of the polarizing plate to hinder visual contact with the transmitted light of the polarizing plate, which can be achieved by imparting a fine uneven structure to the surface of the protective film by, for example, an appropriate method such as a surface roughening method by a sand blast method or an embossing method, or a blending method of transparent fine particles. As the fine particles to be contained in the formation of the surface fine uneven structure, transparent fine particles such as inorganic fine particles, which have often conductivity, composed of silica, alumina, titania, zirconia, tin oxide, indium oxide, cadmium oxide, antimony oxide or the like, having an average particle diameter of 0.5 to 20 μm, or organic fine particles composed of crosslinked or uncrosslinked polymers or the like are used. In the case of forming the surface fine uneven structure, the used amount of the fine particles may generally be about 2 to 70 parts by weight or so, or about 5 to 50 parts by weight or so, relative to 100 parts by weight of the transparent resin forming the surface fine uneven structure. The anti-glare layer may also serve as a diffusion layer (viewing angle enlargement function or the like) for diffusing the transmitted light of the polarizing plate to enlarge viewing angles or the like.

The antireflection layer, anti-sticking layer, diffusion layer or antiglare layer, and the like can be formed on the protective film, as well as can also be formed as a separate optical layer by a separate body from the protective film.

The polarizing plate of the present application can be used as an optical film laminated with another optical layer in practical use. The optical layer is not particularly limited, but for example, one or two or more of optical layers, which are used in forming a liquid crystal display device or the like, such as a reflection plate or a semi-transmissive plate, a retardation plate (including a half- or quarter-wavelength plate or the like) or a viewing angle compensation film can be used. Particularly, it may be a reflective polarizing plate or a semi-transmissive polarizing plate in which a reflection plate or a semi-transmissive reflection plate is further laminated on the polarizing plate of the present application, an elliptically polarizing plate or a circularly polarizing plate in which a retardation plate is further laminated on the polarizing plate, a wide viewing angle polarizing plate in which a viewing angle compensation film is further laminated on the polarizing plate, or a polarizing plate in which a brightness enhancement film is further laminated on the polarizing plate.

The reflective polarizing plate is formed by forming a reflection layer on a polarizing plate, which is for forming a liquid crystal display device or the like of a type that incident light is reflected and displayed from the visual contact side (display side), and has a advantage such that the incorporation of a light source such as a backlight can be omitted and thus it is easy to make the liquid crystal display device thinner. The formation of the reflective polarizing plate can be performed by a suitable method such as a method of laying a reflection layer composed of metal or the like on one side of the polarizing plate through a transparent protective layer or the like, if necessary.

A specific example of the reflective polarizing plate may include one or the like that a reflection layer is formed by laying a foil or a vapor deposition film composed of a reflective metal such as aluminum on one side of a protective film matted, if necessary. Furthermore, it may also include one or the like that fine particles are contained in the protective film to form a surface fine uneven structure and a reflection layer having a fine uneven structure is formed thereon. The above-described reflection layer of the fine uneven structure has advantages and the like that directivity and flashes can be prevented by diffusing incident light by scattered reflection and stains of light and shade can be suppressed. In addition, the protective film containing fine particles has an advantage or the like that the incident light and the reflected light thereof are diffused when they are transmitted therethrough, whereby the stains of light and shade can be further suppressed. The reflection layer of the fine uneven structure reflecting the surface fine uneven structure of the protective film can be formed by directly laying metal on the surface of the transparent protective layer by, for example, an appropriate method such as a deposition method such as a vacuum deposition method, an ion plating method or a sputtering method, or a plating method.

The reflection plate may also be used by a reflection sheet formed by forming a reflection layer on a suitable film based on the transparent film instead of directly applying it to the protective film of the polarizing plate. Furthermore, since the reflection layer is usually composed of metal, the use form in which the reflecting surface is covered with a protective film or a polarizing plate, and the like may be used in that the decrease of the reflectance due to oxidation is prevented, and moreover, the initial reflectance lasts for a long time or a separate laying of the protective layer is avoided.

In addition, the semi-transmissive polarizing plate can be obtained by forming the above reflection layer as a semi-transmissive reflection layer such as a half mirror that reflects and also transmits light. The semi-transmissive polarizing plate can form a liquid crystal display device or the like of the type that the semi-transmissive polarizing plate is usually formed on the back side of a liquid crystal cell, and thus when a liquid crystal display device or the like is used in a relatively bright atmosphere, an image is displayed by reflecting incident light from a visual contact side (display side), and in a relatively dark atmosphere, an image is displayed using an internal light source such as a backlight built in the back side of the semi-transmissive polarizing plate. That is, the semi-transmissive polarizing plate is useful for forming a liquid crystal display device or the like of the type which can save energy for use of a light source such as a backlight under a bright atmosphere and can be used by using a built-in light source even under a relatively dark atmosphere.

An elliptically polarizing plate or a circularly polarizing plate in which a retardation plate is further laminated on a polarizing plate will be described. A retardation plate or the like is used when changing linearly polarized light to elliptically polarized light or circularly polarized light, changing elliptically polarized light or circularly polarized light to linearly polarized light, or changing a polarizing direction of linearly polarized light. Particularly, a so-called quarter wavelength plate (also referred to as a λ/4 plate) is used as the retardation plate for changing linearly polarized light to circularly polarized light or changing circularly polarized light to linearly polarized light. A half wavelength plate (also referred to as a λ/2 plate) is used when changing a polarizing direction of linearly polarized light.

The elliptically polarizing plate is effectively used for compensating for coloring (blue or yellow) caused by birefringence of a liquid crystal layer in a super twisted nematic (STN) type liquid crystal display device and performing black and white display without the coloring. Furthermore, one controlling a three-dimensional refractive index can also compensate (prevent) for the coloring caused when the screen of the liquid crystal display device has been viewed in an oblique direction. The circularly polarizing plate is effectively used, for example, in the case of adjusting a color tone of an image of a reflective liquid crystal display device in which the image is a color display, and also has a function of preventing reflection. A specific example of the above-described retardation plate may include a birefringent film formed by stretching a film composed of a suitable polymer such as polycarbonate, polyvinyl alcohol, polystyrene, polymethyl methacrylate, polypropylene or other polyolefin, polyallylate or polyamide, an orientation film of a liquid crystal polymer, or one supporting an orientation layer of a liquid crystal polymer as a film, and the like. The retardation plate may be one having an appropriate phase difference depending on the purpose of use, such as, for example, one intended to compensate for coloring or viewing angles, and the like due to birefringence of various wavelength plates or liquid crystal layers, and may be one that controls optical characteristics such as a phase difference by laminating two or more kinds of retardation plates, and the like.

In addition, the elliptically polarizing plate or the reflection type elliptically polarizing plate is formed by laminating a polarizing plate or a reflective polarizing plate and a retardation plate in an appropriate combination. Such an elliptically polarizing plate or the like can also be formed by sequentially laminating a (reflective) polarizing plate and a retardation plate separately in the manufacturing process of the liquid crystal display device so as to be a combination of them, but as described above, one previously produced as an optical film such as an elliptically polarizing plate has an advantage capable of improving the manufacturing efficiency of liquid crystal display devices and the like because it has excellent quality stability or lamination workability, and the like.

The viewing angle compensation film is a film for enlarging the viewing angle so that an image is seen relatively clearly even when the screen of the liquid crystal display device is viewed in a direction slightly tilted rather than perpendicular to the screen. Such a viewing angle compensation retardation plate is composed of, for example, a retardation film, an orientation film of a liquid crystal polymer or the like, or one supporting an orientation layer of a liquid crystal polymer or the like on a transparent base material, and the like. A polymer film with birefringence uniaxially stretched in the plane direction is used for a general retardation plate, whereas a polymer film with birefringence biaxially stretched in the plane direction or a bi-directionally stretched film such as a polymer with birefringence uniaxially stretched in the plane direction and stretched in the thickness direction, where a refractive index in the thickness direction is controlled, or an oblique orientation film, and the like is used for a retardation plate used as a viewing angle compensation film. The oblique orientation film may include one formed by bonding a heat shrinkable film to a polymer film and stretching and/or shrinking the polymer film under the action of its shrinking force by heating, or one formed by obliquely orienting a liquid crystal polymer, and the like. The polymer as a raw material of the retardation plate uses the same polymer as described in the foregoing retardation plate, which can use an appropriate one for the purpose of preventing the coloring or the like due to the change of the virtual contact angle based on the phase difference by the liquid crystal cell or enlarging the viewing angle with good virtual contact.

In addition, in view of achieving a wide viewing angle with good virtual contact, and the like, an optical compensation retardation plate can be used, in which an optically anisotropic layer composed of an orientation layer of a liquid crystal polymer, in particular, an oblique orientation layer of a discotic liquid crystal polymer, is supported by a triacetyl cellulose film.

A polarizing plate having a polarizing plate and a brightness enhancement film is usually formed on the back side of the liquid crystal cell. If a backlight of a liquid crystal display device or the like or natural light by reflection or the like in the back side is incident, the brightness enhancement film exhibits a characteristic of reflecting linearly polarized light of a predetermined polarization axis or circularly polarized light of a predetermined direction and transmitting other light, where a polarizing plate in which the brightness enhancement film is laminated with a polarizing plate performs incidence of light from a light source such as a backlight to obtain transmitted light in a predetermined polarization state and simultaneously reflects light other than the predetermined polarization state without transmission. The luminance can be improved by reversing the light reflected from the surface of this brightness enhancement film through a reflection layer or the like formed on the further back side to reenter the brightness enhancement film, transmitting a part or all of the light as light in a predetermined polarization state to promote increase of light transmitted through the brightness enhancement film, and simultaneously supplying polarized light that is difficult to be absorbed by the polarizer to promote increase of the light quantity usable for image display or the like of the liquid crystal display device. That is, when light is incident from the back side of the liquid crystal cell through the polarizer by a backlight or the like without using a brightness enhancement film, light having polarization directions that do not coincide with the polarization axis of the polarizer is almost absorbed by the polarizer, and does not transmit the polarizer. That is, although it varies depending on the characteristics of the used polarizer, about 50% of the light is absorbed by the polarizer, and accordingly, the light quantity usable for liquid crystal image display or the like decreases and the image darkens. The brightness enhancement film repeats the step of once reflecting the light having the polarization direction absorbed by the polarizer in the brightness enhancement film without entering the polarizer, inverting the light through the reflection layer or the like formed on the further back side to reenter the brightness enhancement film, and the brightness enhancement film transmits only the polarized light, in which the polarization direction of the light reflected and inverted between both is a polarization direction capable of passing through the polarizer, to supply the polarizer, whereby light such as a backlight can be efficiently used for image display of the liquid crystal display device and the screen can be brightened.

A diffusion plate may be formed between the brightness enhancement film and the reflection layer or the like. The light in a polarization state reflected by the brightness enhancement film is directed to the reflection layer or the like, but the installed diffusion plate diffuses uniformly the light to be passed through, and at the same time, resolves the polarization state and becomes a depolarization state. That is, the diffusion plate returns the polarized light to the original natural light state. It is repeatedly performed that the light of this depolarization state, that is, the natural light state, is directed to the reflection layer or the like, is reflected through the reflection layer or the like, passes again through the diffusion plate, and reenters the brightness enhancement film. By forming a diffusion plate for returning the polarized light to the original natural light state between the brightness enhancement film and the reflection layer or the like, uneven brightness of the display screen can be reduced while maintaining brightness of the display screen, and a uniform and bright screen can be provided. By forming such a diffusion plate, it is considered that the number of repetitions of the first incident light can be appropriately increased, and a uniform and bright display screen can be provided in addition to the diffusing function of the diffusion plate.

As the brightness enhancement film, for example, an appropriate one such as one exhibiting a characteristic of transmitting linearly polarized light of a predetermined polarization axis and reflecting other light, like a multilayer laminate of a dielectric multilayer thin film or a thin film having different refractive index anisotropy, or one exhibiting a characteristic of reflecting either left-handed or right-handed circularly polarized light and transmitting other light, like an orientation film of a cholesteric liquid crystal polymer or one supporting the orientation liquid crystal layer on a film base material may be used.

Therefore, in the brightness enhancement film of the type that transmits the linearly polarized light of the predetermined polarization axis, by performing incidence of the transmitted light on the polarizing plate with the polarization axis in order as it is, it may be efficiently transmitted while suppressing the absorption loss by the polarizing plate. On the other hand, in the brightness enhancement film of the type that transmits circularly polarized light like a cholesteric liquid crystal layer, it may also be incident on the polarizer as it is, but in terms of suppressing the absorption loss, the circularly polarized light may be linearly polarized through a retardation plate to enter the polarizing plate. Furthermore, by using a quarter wavelength plate as the retardation plate, circularly polarized light can be converted into linearly polarized light.

A retardation plate functioning as a quarter wavelength plate in a wide wavelength range such as a visible light range can be obtained by a method of superimposing a retardation layer functioning as a quarter wavelength plate with respect to monochromatic light having a wavelength of 550 nm and a retardation layer exhibiting different phase difference characteristics, for example, a retardation layer functioning as a half wavelength plate, and the like. Therefore, the retardation plate disposed between the polarizing plate and the brightness enhancement film may be composed of one or two or more retardation layers.

In addition, for the cholesteric liquid crystal layer, one reflecting circularly polarized light in a wide wavelength range such as a visible light range can be obtained with a disposition structure that two or three or more layers are superimposed by combining those having different reflection wavelengths, and accordingly, the transmitted circularly polarized light in a wide wavelength range can be obtained.

Furthermore, the polarizing plate may be composed of one laminating a polarizing plate and two or three or more optical layers, such as the polarized light separating polarizing plate. Therefore, a reflection type elliptically polarizing plate or a semi-transmissive elliptically polarizing plate, in which the reflective polarizing plate or the semi-transmissive polarizing plate and a retardation plate are combined, may be used.

The optical film laminating the optical layer on the polarizing plate can also be formed by a method of sequentially laminating them separately in the process of manufacturing a liquid crystal display or the like, but one formed as the optical film by previously laminating them has an advantage of having excellent quality stability or combination workability and capable of improving the manufacturing process of liquid crystal display devices or the like. An appropriate adhesion means such as a pressure-sensitive adhesive layer can be used for the lamination. Upon bonding the above-described polarizing plate or other optical films, their optical axes may have appropriate disposition angles depending on desired phase difference characteristics and the like.

A pressure-sensitive adhesive layer for bonding to other members such as a liquid crystal cell may also be formed on the above-described polarizing plate or the optical film in which at least one polarizing plate is laminated. The pressure-sensitive adhesive for forming the pressure-sensitive adhesive layer is not particularly limited, where one using, for example, a polymer such as an acrylic polymer, a silicone polymer, polyester, polyurethane, polyamide, polyether, fluorine series or rubber series as a base polymer can be appropriately selected and used. In particular, one, such as an acrylic pressure-sensitive adhesive, which has excellent optical transparency, exhibits proper wettability and pressure-sensitive adhesive properties of cohesiveness and adhesiveness, and has excellent weather resistance or heat resistance, and the like can be used.

In addition, in view of prevention of a foaming phenomenon or a peeling phenomenon due to moisture absorption, degradation of optical characteristics or prevention of liquid crystal cell warpage due to difference in thermal expansion and the like, and further formation properties of liquid crystal display devices having high quality and excellent durability, and the like, a pressure-sensitive adhesive layer having a low moisture-absorbing ratio and excellent heat resistance can be used in addition to the foregoing.

The pressure-sensitive adhesive layer may contain additives of those which are added to the pressure-sensitive adhesive layer, such as, for example, natural or synthetic resins, particularly, tackifier resins, or fillers consisting of glass fiber, glass beads, metal powders, other inorganic powders, and the like, or pigments, colorants or antioxidants. Also, it may be a pressure-sensitive adhesive layer exhibiting light diffuseness by containing fine particles.

The laying of a pressure-sensitive adhesive layer on one side or both sides of a polarizing plate or an optical film can be performed in an appropriate manner. An example thereof may include a method of preparing about 10 to 40 wt % of a pressure-sensitive adhesive solution, in which a base polymer or a composition thereof is dissolved or dispersed in a solvent composed of a single solvent or a mixture of appropriate solvents such as toluene or ethyl acetate and directly laying it on a polarizing plate or an optical film by an appropriate spreading method such as a flexible method or a coating method, or a method of forming a pressure-sensitive adhesive layer on a separator in accordance with the above-mentioned method, and transferring it onto a polarizing plate or an optical film and attaching it thereto, and the like.

The pressure-sensitive adhesive layer may also be formed on one side or both sides of a polarizing plate or an optical film as a superimposed layer of different compositions or kinds, and the like. Furthermore, in the case of being formed on both sides, it is also possible to use pressure-sensitive adhesive layers of different compositions or kinds, or thicknesses and the like on the front and back sides of a polarizing plate or an optical film. The thickness of the pressure-sensitive adhesive layer may be appropriately determined depending on the purpose of use, the adhesive force, and the like, and may be generally 1 to 500 μm, 5 to 200 μm, or 10 to 100 μm.

The exposed surface of the pressure-sensitive adhesive layer is temporarily attached with a separator to be covered for the purpose of preventing contamination thereof or the like until it is used for practical use. Accordingly, it is possible to prevent the contact with the pressure-sensitive adhesive layer in a usual handling state. As the separator, a conventionally appropriate one except for the above thickness condition, such as one in which a thin leaf body such as, for example a plastic film, a rubber sheet, a paper, a cloth, a non-woven fabric, a net, a foam sheet, a metal foil or a laminate thereof is coated with a suitable releasing agent such as silicone series or long chain alkyl series, fluorine series or molybdenum sulfide, if necessary, can be used.

Also, in the present application, each layer of the polarizer or protective film forming the above-described polarizing plate or the optical film, and the like, and also the pressure-sensitive adhesive layer or the like may be one or the like having ultraviolet absorptive capacity by a method of treating with a ultraviolet absorbing agent such as, for example, a salicylate ester compound or a benzophenol compound, a benzotriazole compound or a cyanoacrylate compound, or a nickel complex salt compound, and the like.

The present application also relates to a display device comprising such an optical laminate, for example, a polarizing plate, where the configuration or formation method of the display device follows a known method.

For example, the polarizing plate or the optical film can be used for forming various devices such as a liquid crystal display device, and the like. The formation of a liquid crystal display device can be conventionally performed. That is, the liquid crystal display device is generally formed by appropriately assembling component parts of a liquid crystal cell, a polarizing plate or an optical film and, if necessary, a lighting system or the like, and mounting a driving circuit, and the like, and in the present application, it is not particularly limited, except that the polarizing plate or the optical film according to the present application is used, which can be conventionally applied. For the liquid crystal cell, any type of, for example, a TN type or STN type, a π type, and the like can be used.

A suitable liquid crystal display device such as a liquid crystal display device in which a polarizing plate or an optical film is disposed on one side or both sides of a liquid crystal cell or one in which a backlight or a reflection plate is used in a lighting system can be formed. In this case, the polarizing plate or optical film according to the present application can be installed on one side or both sides of the liquid crystal cell. When the polarizing plates or the optical films are formed on both sides, they may be the same or different. Moreover, in forming a liquid crystal display device, appropriate component parts such as a diffusion plate, an anti-glare layer, an antireflection film, a protective plate, a prism array, a lens array sheet, a light diffusion plate and a backlight can be disposed in one or two or more layers at appropriate locations.

Subsequently, an organic electroluminescence device (organic EL display device) will be described. In general, an organic EL display device forms a light emitting body (organic electroluminescence light emitting body) by sequentially laminating a transparent electrode, an organic light emitting layer and a metal electrode on a transparent substrate. Here, the organic light emitting layer is a laminate of various organic thin films, where configurations having various combinations, such as, for example, a laminate of a hole injection layer composed of a triphenylamine derivative or the like and a light emitting layer composed of a fluorescent organic solid such as anthracene, a laminate of such a light emitting layer and an electron injection layer composed of a perylene derivative or the like, or a laminate of these hole injection layer, light emitting layer and electron injection layer are known.

The organic EL display device emits light on the principle of radiating light when holes and electrons are injected into the organic light emitting layer by applying a voltage to the transparent electrode and the metal electrode, the energy generated by recombination of these holes and electrons excites the fluorescent material and the excited fluorescent material returns to the ground state. The mechanism of recombination during the process is the same as that of a general diode, and as can be expected from this point, the current and the light emission intensity exhibit strong non-linearity accompanied by rectification with respect to the applied voltage.

In the organic EL display device, at least one of the electrodes must be transparent, in order to extract light emission in the organic light emitting layer, where a transparent electrode usually formed of a transparent conductor such as indium tin oxide (ITO) is used as the positive electrode. On the other hand, in order to increase luminance efficiency by facilitating injection of electrons, it is important to use a material having a small work function for the negative electrode, where a metal electrode of Mg—Ag, Al—Li and the like is generally used.

In the organic EL display device having such a structure, the organic light emitting layer is formed of a very thin film with a thickness of about 10 nm or so. For this reason, the organic light emitting layer almost completely transmits the light like the transparent electrode. As a result, the light which is incident from the surface of the transparent substrate upon non-emission, transmitted through the transparent electrode and the organic light emitting layer, and reflected by the metal electrode again goes to the surface side of the transparent substrate, so that when viewed from the outside, the display surface of the organic EL display device looks like a mirror surface.

In an organic EL display device comprising an organic electroluminescence light emitting body formed by having a transparent electrode on the surface side of an organic light emitting layer that emits light by application of a voltage and simultaneously having a metal electrode on the back surface side of the organic light emitting layer, while a polarizing plate is formed on the surface side of the transparent electrode, a retardation plate can be formed between the transparent electrode and the polarizing plate.

The retardation plate and the polarizing plate have a function of polarizing the light incident from the outside and reflected by the metal electrode, thereby having an effect of preventing the mirror surface of the metal electrode from being viewed from the outside by the polarizing action. In particular, if the retardation plate is constituted by a quarter wavelength plate and the angle formed by the polarizing direction of the polarizing plate and the retardation plate is adjusted to π/4, the mirror surface of the metal electrode can be completely shielded.

That is, the external light incident on the organic EL display device transmits only the linearly polarized light component by the polarizing plate. This linearly polarized light becomes elliptically polarized light by the retardation plate, but in particular, when the retardation plate is a quarter wavelength plate and also the angle formed by the polarizing direction of the polarizing plate and the retardation plate is π/4, it becomes circularly polarized light.

This circularly polarized light passes through the transparent substrate, the transparent electrode and the organic thin film; is reflected by the metal electrode; passes again through the organic thin film, the transparent electrode and the transparent substrate; and becomes linearly polarized again by the retardation plate. Then, since the linearly polarized light is orthogonal to the polarization direction of the polarizing plate, it cannot pass through the polarizing plate. As a result, the mirror surface of the metal electrode can be completely shielded.

Advantageous Effects

The present application relates to an adhesive composition and its use. The present application can provide an adhesive composition having excellent water resistance, adhesive force and other optical properties as well as greatly improved storage stability.

MODE FOR INVENTION

Hereinafter, the adhesive composition of the present application will be specifically described through Examples and Comparative Examples, but the scope of the present application is not limited by the following examples.

1. Storage Stability Evaluation

The storage stability of the adhesive composition was evaluated by confirming the time maintained without occurrence of gelation. It was confirmed by leaving each of adhesive compositions of Examples or Comparative Examples at room temperature and evaluating the viscosity at the same time every day whether or not gelation occurred in the adhesive composition, where the time point at which the flowability of the water-based composition disappeared was evaluated as occurrence of gelation.

The results were summarized in Table 1 below.

2. Evaluation of High Temperature and Room Temperature Water Resistance

In the evaluation of high temperature water resistance, a film coated with an adhesive composition was placed in a thermostatic bath at 60° C. and the time point at which the coated adhesive composition was dissolved was evaluated, where the case that the dissolution was not observed was indicated by P in Table 1 below. Also, the room temperature water resistance was evaluated in a thermostatic bath at room temperature in the same manner.

Example 1

As the binder, an acetoacetyl group-modified polyvinyl alcohol resin (Z-200, Nippon Synthetic Chemical Gohasefimer, Co.) was used, and methylol melamine (in Formula 2 below, a compound in which all R's are each a hydroxymethyl group) as a crosslinking agent, 3-glycidoxypropyltrimethoxysilane as a silane compound and a compound of Formula 1 were mixed with the resin to prepare an adhesive composition. Here, as the compound of Formula 1, a compound wherein R in Formula 1 below is a trifluoromethyl group in Formula 1) was used.

The binder, the crosslinking agent, the silane compound and the compound of Formula 1 were mixed in a solvent (deionized water) in a weight ratio of 100:15:10:2 (binder:crosslinking agent:silane compound:composition of Formula 1) to prepare an adhesive composition.

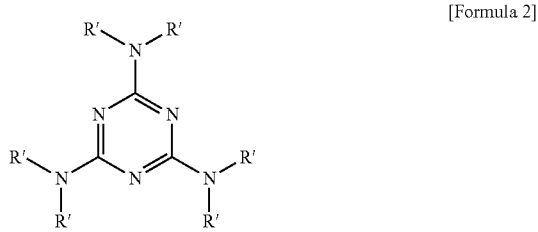

Example 2

As the compound of Formula 1, a compound, wherein R in Formula 1 above is a methyl group, was used and the binder, the crosslinking agent, the silane compound and the compound of Formula 1 were mixed in deionized water as a solvent in a weight ratio of 100:15:10:2 (binder:crosslinking agent:silane compound:compound of Formula 1) to prepare an adhesive composition.

Example 3

As the compound of Formula 1, a compound, wherein R in Formula 1 above is a methyl group, was used and the binder, the crosslinking agent, the silane compound and the compound of Formula 1 were mixed in deionized water as a solvent in a weight ratio of 100:15:10:10 (binder:crosslinking agent:silane compound:compound of Formula 1) to prepare an adhesive composition.

Comparative Example 1

Only a binder (Z-200, Nippon Synthetic Chemical Gohasefimer, Co.) was dispersed in deionized water as a solvent to prepare an adhesive composition.

Comparative Example 2

Only the binder and crosslinking agent of Example 1 were dispersed in deionized water as a solvent in a weight ratio of 100:15 (binder:crosslinking agent) to prepare an adhesive composition.

Comparative Example 3

Only the binder, crosslinking agent and silane compound of Example 1 were dispersed in deionized water as a solvent in a weight ratio of 100:15:10 (binder:crosslinking agent:silane compound) to prepare an adhesive composition.

Comparative Example 4

The binder, crosslinking agent, silane compound and acetic acid of Example 1 were dispersed in deionized water as a solvent in a weight ratio of 100:15:10:10 (binder: crosslinking agent:silane compound:acetic acid) to prepare an adhesive composition.

The physical properties confirmed for Examples and Comparative Examples above were summarized and described in Table 1 below.

TABLE 1

| | | High temperature water resistance | Room temperature water resistance |
|---|---|---|---|
| Example | 1 21 days | P | P |
| | 2 21 days | P | P |
| | 3 21 days | P | P |
| Comparative Example | 1 21 days | Total dissolution | Total dissolution |
| | 2 Less than 1 day | 50% or more dissolution | 50% or more dissolution |
| | 3 Less than 1 day | Partial dissolution | Partial dissolution |
| | 4 Less than 5 days | Partial dissolution | Partial dissolution |

From the results of Table 1, it can be confirmed that through comparison of Comparative Examples 1 to 3, the polyvinyl alcohol binder alone ensures storage stability, but the water resistance is deteriorated, whereas in the case of mixing the crosslinking agent or the silane compound, the water resistance is improved to some extent, but the storage stability is deteriorated. Also, when the acetic acid is mixed, the storage stability is improved to some extent, but the degree of improvement is insufficient and the water resistance is still insufficient.

Accordingly, it can be confirmed that when the compound of Formula 1 according to the present application is mixed, the water resistance and the storage stability are simultaneously improved. Although this is not clear, it is presumed that the compound of Formula 1 is capping the crosslinking agent to increase the storage stability and then is decapping it sufficiently quickly.

The invention claimed is:

1. An adhesive composition comprising:
   water;
   an acetoacetyl group-modified polyvinyl alcohol aqueous binder in a concentration of between 1 to 10 parts by weight relative to 100 parts by weight of the water;
   a methylol melamine crosslinking agent in a ratio of 15 parts by weight relative to 100 parts by weight of the aqueous binder;
   a 3-glycidoxypropyltrimethoxysilane compound in a ratio of 10 parts by weight relative to 100 parts by weight of the aqueous binder; and
   a compound of Formula 1 below, in a ratio of 2 parts by weight relative to 100 parts by weight of the aqueous binder:

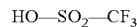
[Formula 1].

2. The adhesive composition according to claim 1, wherein the aqueous binder is in a concentration of between 1 to 8 parts by weight relative to 100 parts by weight of the water.

3. The adhesive composition according to claim 1, wherein the aqueous binder is in a concentration of between 1 to 5 parts by weight relative to 100 parts by weight of the water.

4. An optical laminate comprising:
   a first optical film;
   a second optical film; and
   an adhesive layer of the adhesive composition of claim 1,
   wherein the adhesive layer attaches the first optical film and the second optical film to each other.

5. The optical laminate according to claim 4, wherein the first optical film or the second optical film is a polarizer and the other is a protective film.

6. A display device comprising the optical laminate of claim 4.

* * * * *